Patented Apr. 4, 1950

2,502,477

UNITED STATES PATENT OFFICE 2,502,477

ACID LEACHING OF PECTINOUS MATERIALS

Harry S. Owens, Berkeley, Calif., assignor to the United States of America as represented by the Secretary of Agriculture No Drawing. Application November 13, 1947, Serial No. 785,804

12 Claims. (Cl. 260—209.5)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to pectinous materials and more particularly to methods for isolating low-methoxyl pectinic acids from vegetable materials in which the pectin has been partially de-methoxylated in situ; or, stated in other words, from vegetable materials in which the pectin has been de-methoxylated in situ to low-methoxyl pectinic acids (particularly those having a methoxy content of about 2 to 5%).

The process is applicable to vegetable material serving as a natural source of pectin, the pectin of which has been partially de-methoxylated. Such treatment may involve hydrolysis through the use of acid, alkali, or enzymes. Suitable vegetable materials are orange peel, lemon peel, grapefruit peel, apple pomace, pear pomace, carrots, pea hulls, sugar beets, quinces, grapes, etc.

One prior method for isolating low-methoxyl pectinic acids from vegetable materials in which the pectin had been partially de-methoxylated in situ involved extraction of the material with aqueous sodium hexametaphosphate at a pH of about 4.0. The resulting aqueous extract was then treated with alcohol to precipitate the low-methoxyl pectinic acids.

This method suffers from the disadvantage that it is costly since the sodium hexametaphosphate is a relatively expensive reagent.

It has now been found that the use of sodium hexametaphosphate can be entirely eliminated and the low-methoxyl pectinic acids in the vegetable material rendered water-extractable by subjecting the vegetable material to a leaching with an acid in aqueous solution. Thus instead of the afore-mentioned expensive reagent, a relatively cheap acid is used.

It is an object of this invention to provide methods for isolating low-methoxyl pectinic acids from vegetable material which has been treated to partially de-methoxylate the pectin in situ.

Another object of this invention is to provide a method of treating vegetable material, in which the pectin has been partially de-methoxylated in situ, to render the low-methoxyl pectinic acids easily extractable, said result being attained by leaching the vegetable material with aqueous acid.

A further object of this invention is to provide a method of treating citrus peel, in which the pectin has been partially de-methoxylated in situ, to render the low-methoxyl pectinic acids water-extractable, said result being accomplished by leaching of the peel with aqueous acid.

Further objects and advantages will be obvious to those skilled in the art from the disclosure herein.

The preferred methods of partially de-methoxylating the pectin are those disclosed in the patent application of Harry S. Owens and William D. Maclay, Serial No. 529,016, filed March 31, 1944, now Patent No. 2,444,266, issued June 29, 1948, wherein an aqueous dispersion of citrus peel is subjected to partial de-methoxylation by enzymic hydrolysis, by adding alkali and maintaining a pH of 6 to 10 at a temperature of 0° C. to 60° C. preferably a short period of time of the order of less than about 30 minutes, or with a calculated amount of alkali limited to yield the desired degree of de-methoxylation.

To effect the ends previously set forth, the vegetable material, in which the pectin has been partially de-methoxylated in situ, is leached with aqueous acid at a pH from about 0 to about 2.5, preferably 2.0. Any acid that does not form insoluble salts with calcium at this pH range can be employed. Thus, although hydrochloric acid is preferred, other acids such as sulphuric, phosphoric, nitric, etc., can be used. Generally, the leaching is carried out at temperatures above room temperature to obtain rapid results. As a rule, the temperature should not be raised above 50° C. to prevent decomposition of the pectinous substances. Thus a temperature range from about 20° C. to 50° C. is suitable. In many cases it may be necessary to employ several leachings to get the proper results, i. e., the lowering of the calcium content in the vegetable material to about 0.2% or less. The acid leach may be effected by several batchwise treatments with filtration after each treatment. However, the leaching is more readily accomplished by utilizing the countercurrent flow technique disclosed in the application of Robert P. Graham and Allan D. Shepherd, Serial No. 788,076, filed November 25, 1947. To this end the vegetable material may be slowly moved through an extraction zone (a trough equipped with a long screw, for instance) while it is subjected to a countercurrent flow of acid adjusted to the proper pH. In this manner, the acid leach may be accomplished in one operation without the necessity of filtration or undue handling.

Regardless of what technique is used for the acid leaching, this treatment renders the low-methoxyl pectinic acids in the vegetable material capable of being extracted with water. After the acid leach is finished, the vegetable material may be immediately subjected to such water extraction or may be dried for future extraction.

In either case the leached (or leached and dried) vegetable material is digested with water, the pH of the mixture of vegetable material and water being adjusted to about 3.0 to about 5.0 by the addition of a base such as sodium hydroxide, sodium carbonate, sodium bicarbonate, potassium hydroxide, potassium carbonate, potassium bicarbonate, aqua ammonia, carbonates of ammonia, etc. In this digestion the temperature is preferably raised to boiling (100° C.) although this is not essential. The digestion mixture is filtered preferably with the addition of a filter aid such as the acid treated diatomaceous earth filter aids available on the market. The filtrate containing the low-methoxyl pectinic acids in aqueous solution can be isolated in several ways. According to one procedure, alcohol is added to the filtrate whereby the low-methoxyl pectinic acids are precipitated. They are then separated by filtration, washed with alcohol and dried. According to another procedure, the low-methoxyl pectinic acids are precipitated by addition of isopropyl alcohol. Other methods involve spray-drying or drum-drying of the aqueous solution; precipitation of the low-methoxyl pectinic acids with a soluble aluminum salt at a pH of about 4.0, followed by removal of the aluminum from the formed aluminum-pectinous complex with acidified aqueous alcohol; precipitation with a metal ion such as calcium, copper, or nickel, followed by removal of the metal either by washing with acidified aqueous alcohol or by means of an ion exchange material. A simple but efficacious method of isolating low-methoxyl pectinic acids involves merely adding an acid such as sulphuric, hydrochloric, nitric, phosphoric, sulphurous, etc., to the filtrate to establish a pH not exceeding 2.3, preferably not exceeding 2.0. The low-methoxyl pectinic acids are thereby precipitated and can be separated, washed, and dried. The process of isolating low-methoxyl pectinic acids by acid precipitation is disclosed and claimed in the Patent application of Rolland M. McCready, Harry S. Owens, and William D. Maclay, Serial No. 616,445, filed September 14, 1945, now Patent No. 2,448,818, issued September 7, 1948.

The following examples describe particular steps, conditions, and materials according to this invention but it is to be understood that these examples are submitted only by way of illustration and not limitation.

EXAMPLE 1

(A) De-methoxylation of peel

Five pounds of fresh orange peel was ground in a meat grinder, dispersed in 7.5 liters of water and sufficient 2 N sodium hydroxide solution added to adjust the pH of the mixture to 8.5. The temperature was maintained at about 25° C. and the pH maintained at 8.5 for about 15 minutes by gradual addition of 0.5 N sodium hydroxide solution. This treatment had the effect of partially de-methoxylating the pectin in situ by the action of the enzymes present in the peel.

(B) Acid leaching of peel

The dispersion was then rapidly acidified to a pH of 2.0 by the addition of hydrochloric acid and the temperature raised to 40° C. After a period of 30 minutes the dispersion was filtered. The filter cake was dispersed in 7.5 liters of water at 40° C. and the pH adjusted to 2.0 by the addition of hydrochloric acid. After a period of 30 minutes the dispersion was filtered. The filter cake was subjected to a third leaching as described above and the dispersion filtered. This treatment results in the removal of calcium from the peel and renders the low-methoxyl pectinic acid therein capable of being extracted with water.

(C) Extraction of low-methoxyl pectinic acid

The filter cake from the final leach was dispersed in 6 liters of water and sufficient sodium hydroxide added to establish a pH of 4.0. The dispersion was heated to boiling and at the end of 30 minutes the dispersion was filtered with the aid of a purified diatomaceous earth filter aid. The filtrate was poured into 12 liters of 47.5% alcohol which had been acidified to a pH of 1.5. The pectinic acids which precipitated were filtered off, washed with dilute alcohol and dried. A yield of 65 grams of pectinic acid having a methoxyl content of 4.1% was obtained.

In the above example, the filter aid was purified by digesting it with an aqueous solution of sodium hexametaphosphate, the purpose being to remove iron and other polyvalent metal ions which would tend to form insoluble salts with the pectinic acids and thus retain them in the filter cake. This purification can also be accomplished by washing the filter aid with acid, followed by a water wash.

EXAMPLE 2

(A) De-methoxylation of peel

Twenty pounds of burred and sliced lemon peel was suspended in 10 gallons of water. Forty-five grams of sodium hydroxide was added to bring the pH to 8.7 in 10 minutes. An additional 19 grams of sodium hydroxide was added over a period of 23 minutes. Two hundred ml. of concentrated hydrochloric acid was added to reduce the pH to 2.0. The dispersion was rapidly heated to 50° C. for a few minutes, then the peel filtered and placed in storage.

(B) Acid leaching

Fifteen pounds of the stored peel was leached three times using in each treatment 15 gallons of water acidified with hydrochloric acid to a pH of 2.0 and operating at a temperature of 120° F.

(C) Extraction of low-methoxyl pectinic acid

The peel from the final acid leach was dispersed in 50 lbs. of water and the pH adjusted to 4.3 by addition of sodium hydroxide. The dispersion was heated to 200° F. and at the end of a 30-minute period, including the time taken to raise the temperature to 93° C. (200° F.), the dispersion was filtered with the assistance of a filter aid.

(D) Precipitation of low-methoxyl pectinic acid

To the filtrate was added 130 ml. concentrated sulphuric acid and one gallon of alcohol. The precipitate of low-methoxyl pectinic acid was washed with dilute alcohol and dried. The low-methoxyl pectinic acid product had a methoxyl content of 4.5%. The yield was about 150 g.

As set forth above, this invention concerns the acid-leaching vegetable material in which the pectin has been partially de-methoxylated in situ. Such acid leaching has the primary effect of removing calcium from the vegetable material and thus the low-methoxyl pectinic acids in the peel can be extracted by water. The vegetable material may be partially de-methoxylated by a number of methods. Thus the partial de-methoxylation may be effected through hydrolysis by the use of acid, alkali, or enzymes.

As used herein, "pectin" is defined as the familiar preparation of commerce or the laboratory, prepared from plant extracts by precipitation with alcohol, acetone, or metallic salts with no attempt to modify its natural methoxyl content. By "pectic acid" is meant a completely de-methoxylated pectin, and by "pectinic acid" is meant any one of a series of derivatives of pectin with methoxyl content intermediate between that of pectin and pectic acid. Our process is particularly adapted to the isolation of low-methoxyl pectinic acids having a methoxyl content from about 2 to 5%.

Having described my invention, I claim:

1. The process which comprises leaching vegetable material, in which the pectin has been partially de-methoxylated in situ, with aqueous acid at a pH from about 0 to about 2.5, then extracting the low-methoxyl pectinic acids from the leached vegetable material by extraction with water adjusted to a pH from about 3.0 to about 5.0 by the addition of a base.

2. The process which comprises leaching citrus peel, in which the pectin has been partially de-methoxylated in situ, with aqueous acid at a pH from about 0 to about 2.5, then extracting the low-methoxyl pectinic acid from the leached peel by extraction with water adjusted to a pH from about 3.0 to about 5.0 by the addition of a base.

3. The process which comprises leaching citrus peel, in which the pectin has been partially de-methoxylated in situ, with aqueous acid at a pH from about 0 to about 2.5 until calcium is substantially completely removed from said peel, then extracting the low-methoxyl pectinic acids from the leached peel by extraction with water adjusted to a pH from about 3.0 to about 5.0 by the addition of a base.

4. The process which comprises leaching citrus peel, in which the pectin has been partially de-methoxylated in situ, with aqueous acid at a pH of about 2.0 until the calcium content of said peel is not greater than 0.2%, then extracting the low-methoxyl pectinic acids from the leached peel by extraction with water adjusted to a pH of about 4.0 by the addition of a base.

5. The process which comprises leaching citrus peel in which the pectin has been partially de-methoxylated in situ, with aqueous hydrochloric acid at a pH of about 2.0 until the calcium content of said peel is not greater than about 0.2%, then extracting the low-methoxyl pectinic acids from the leached peel by extraction with water adjusted to a pH of about 4.0 by the addition of sodium hydroxide.

6. The process which comprises leaching vegetable material, in which the pectin has been partially de-methoxylated in situ, with aqueous acid at a pH from about 0 to about 2.5.

7. The process which comprises leaching citrus peel, in which the pectin has been partially de-methoxylated in situ, with aqueous acid at a pH from about 0 to about 2.5.

8. The process which comprises leaching citrus peel, in which the pectin has been partially de-methoxylated in situ, with aqueous acid at a pH from about 0 to about 2.5 until calcium is substantially completely removed from said peel.

9. The process which comprises leaching citrus peel, in which the pectin has been partially de-methoxylated in situ, with aqueous acid at a pH of about 2.0 until the calcium content of said peel is not greater than 0.2%.

10. The process which comprises leaching citrus peel, in which the pectin has been partially de-methoxylated in situ, with aqueous hydrochloric acid at a pH of about 2.0 until the calcium content of said peel is not greater than 0.2%.

11. The process which comprises subjecting an aqueous dispersion of citrus peel to partial de-methoxylation by enzymic hydrolysis, by adding an alkali to maintain the dispersion at a pH of 6 to 10, at a temperature of 0° C. to 60° C. for a period of no longer than about 30 minutes, acidifying to halt the hydrolysis, filtering off the peel, and leaching the peel with aqueous acid at a pH from about 0 to about 2.5 until the calcium content of said peel is not greater than 0.2%, and extracting the low-methoxyl pectinic acids from the leached citrus peel by extraction with water adjusted to a pH from about 3.0 to about 5.0 by the addition of a base.

12. A process comprising subjecting pectin in situ in citrus peel to partial de-methoxylation, leaching the citrus peel with aqueous hydrochloric acid at a pH of about 0 to about 2.5 at about 20° to 50° C. until the calcium content in the peel is about 0.2% or less, digesting the leached peel with hot water at a pH of about 3.0 to about 5.0, separating the peel from the water, and recovering low-methoxyl pectinic acid from the water.

HARRY S. OWENS.

REFERENCES CITED

The following references are of record in the file of this patent:

UNITED STATES PATENTS

| Number | Name | Date |
|---|---|---|
| 2,444,266 | Owens et al. | June 29, 1948 |
| 2,448,818 | McCready et al. | Sept. 7, 1948 |